United States Patent [19]

Schalles

[11] Patent Number: 5,088,362
[45] Date of Patent: Feb. 18, 1992

[54] DRIVE FOR WORKPIECE SPINDLE OF MACHINE TOOL

[75] Inventor: Erhard Schalles, Bielefeld, Fed. Rep. of Germany

[73] Assignee: Gildemeister Aktiengesellschaft, Bielefeld, Fed. Rep. of Germany

[21] Appl. No.: 472,360

[22] Filed: Jan. 29, 1990

[30] Foreign Application Priority Data

Jan. 28, 1989 [DE] Fed. Rep. of Germany ....... 3902592

[51] Int. Cl.⁵ .................... B23B 19/02; H02K 9/00
[52] U.S. Cl. ........................... 82/142; 82/900; 310/59; 310/62; 310/89; 310/261
[58] Field of Search .................... 310/52, 57, 58, 59, 310/61, 62, 64, 65, 60 R, 60 A, 1, 66, 112, 157, 89, 261, 91; 82/142, 147, 900

[56] References Cited

U.S. PATENT DOCUMENTS

| 2,039,146 | 4/1936 | Burrell | 310/63 |
| 3,461,328 | 8/1969 | Drouard | 310/59 |
| 3,517,232 | 6/1970 | Sano | 310/59 |
| 3,749,949 | 7/1973 | Muller | 310/59 |
| 3,840,762 | 10/1974 | Kasabian | 310/90 |
| 3,932,778 | 1/1976 | Watanabe | 310/61 |
| 4,531,357 | 7/1985 | Weber | 310/57 |
| 4,742,257 | 5/1988 | Carpenter | 310/58 |
| 4,867,619 | 9/1989 | Briggs | 82/147 |
| 4,922,146 | 5/1990 | Vanduyn | 310/60 R |

FOREIGN PATENT DOCUMENTS 0094680 10/1986 European Pat. Off. .
2724440 9/1984 Fed. Rep. of Germany .

OTHER PUBLICATIONS

"Ultraprecision in Manufacturing Engineering" Edited by: Manfred Weck and Robert Hartel. Springer Verlag, Berlin Heidelberg; (no month) 1988.

Primary Examiner—R. Skudy
Attorney, Agent, or Firm—Michael J. Striker

[57] ABSTRACT

A drive for workpiece spindle of a machine tool comprises a drive motor to be arranged on the free end of a workpiece spindle, a motor housing, a rotor to be mounted on the workpiece spindle and a stator arranged in the motor housing. The motor housing is connectable with a spindle box and has a motor cover. Cooling medium passages extend between the motor housing and the motor cover, between the rotor and the workpiece spindle and between the spindle box and the rotor.

9 Claims, 3 Drawing Sheets

DRIVE FOR WORKPIECE SPINDLE OF MACHINE TOOL

BACKGROUND OF THE INVENTION

The present invention, relates generally to drives for workpiece spindles of machine tools.

More particularly, it relates to a drive of the above mentioned general type which includes a drive motor arranged on the free end of the workpiece spindle, wherein the rotor of the drive motor is mounted on the workpiece spindle and the stator is arranged in the motor housing connected with the spindle box of the workpiece spindle.

Drives of the above mentioned type are known in the art and disclosed for example in the Book "Ultraprecision in Manufacturing Engineering", Springer Verlag, 1988, pages 206–207. The workpiece spindle shown in this reference is supported aerostatically in a spindle box. An electric motor is arranged on the end of the workpiece spindle facing away of the workpiece clamping chuck where conventionally the belt pulley of the spindle drive is provided. The rotor is mounted directly on the workpiece spindle.

The German reference DE-PS 2,724,440 proposed a drive which is mounted between the workpiece spindle bearings on the workpiece spindle inside the spindle box. A ring chamber is provided in the hollow workpiece spindle and filled with a heat-conductive medium. Thereby the heat produced by the drive motor is transported to a workpiece spindle region which is surrounded by an air flow chamber. While a thermal shock can be avoided here, a considerable temperature difference is required for withdrawing the produced heat, so that heat expansion of the workpiece spindle does not significantly reduce the accuracy of the working of the workpiece clamped in the machine tool.

The European Patent Document EP-B 94,680 discloses a drive which is also arranged between the bearing points of the workpiece spindle. Here, first of all, the stator is cooled with an air stream and secondly the front stationary bearing is protected from the heat transfer. Between the stationary bearing and the drive motor, a ring chamber for a cooling medium is provided. Here also the problem of heat influence is not solved in a satisfactory manner by the above proposed features, since the workpiece spindle in the region of the motor can be heated unlimitedly. Thereby the whole workpiece spindle can also be heated by the heat transport in metals is very high.

Both last mentioned drives are suitable only for small outputs due to the above mentioned difficulties as well as due to the small space between the bearings. At the same time motors of higher power and thereby higher sizes can be arranged outside the spindle bearings on the ends of the workpiece spindle.

SUMMARY OF THE INVENTION

Accordingly, it is an object of the present invention to provide a drive for workpiece spindles of machine tools which avoids the disadvantages of the prior art.

More particularly, it is an object of the present invention to provide a drive for workpiece spindles of machine tools, which has a drive motor arranged on a free end of the workpiece spindle, wherein the influence of heat produced by the motor is retained as small as possible. More particularly a transfer of the motor heat to the workpiece spindle is avoided.

In keeping with these objects and with others which will become apparent hereinafter, one feature of the present invention resides/ briefly stated, in a drive for a workpiece spindle of a machine tool in which the cooling medium passages are provided between the motor housing and the motor cover, the rotor and the workpiece spindle, and the spindle box and the rotor.

Thereby the cooling medium flows almost to all sides around the drive motor and the transfer of the heat to one of the adjoining structural parts is eliminated. So much heat is withdrawn from the motor that the temperature increase due to the own heat generation is very low.

Since the operational accuracy of the machine tool is immediately affected when the workpiece spindle is heated and therefore expanded, it is especially important to provide separation of the workpiece spindle from the rotor. The regions required for the torque transmission, such as for example in form of webs, are flown around by the cooling medium. Therefore only low residual heat reaches the spindle. The surface regions of the workpiece spindle underneath the cooling medium passages are insulated by the cooling medium completely from the motor chamber.

The mounting of such a drive and its insertion is facilitated when the rotor is mounted on the workpiece spindle with adjustable clamping elements and the housing which contains the stator is screwed with the spindle box. The clamping elements and the housing flange can be provided then with the cooling passages in a simple manner.

In accordance with an advantageous feature of the present invention, the cooling can be provided in an outer circulating circuit with normal ambient air. The inner cooling medium circulation must be made with a filtered air to avoid operational disturbances of the motor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
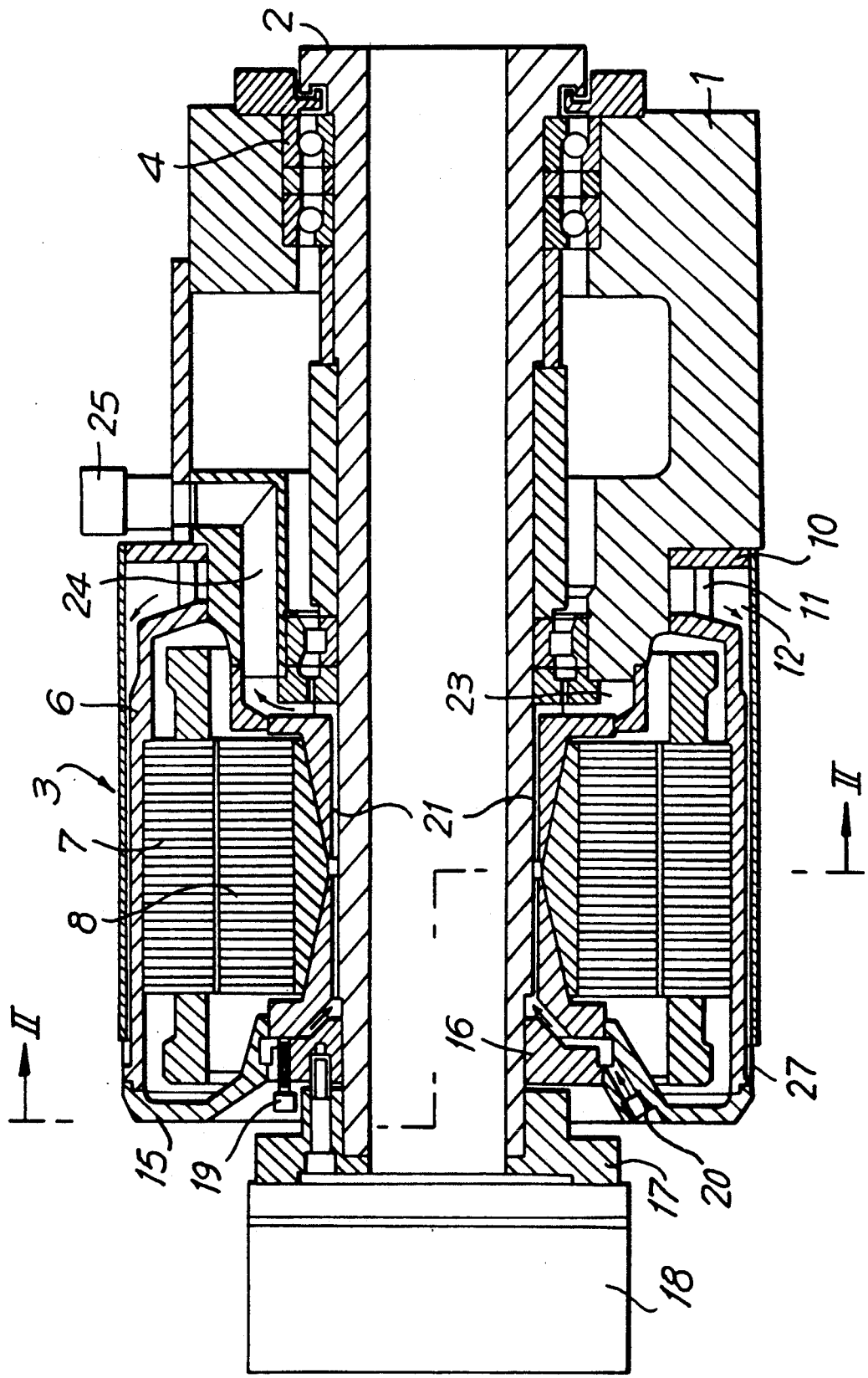
FIG. 1 is view showing a longitudinal section of a spindle box with a drive for a workpiece spindle in accordance with the present invention.

A workpiece spindle 2 is rotatably supported in a spindle box 1. A drive motor 3 is provided at the end of the spindle, where conventionally a belt drive is arranged. Thereby a separation of the spindle box 1 and the motor chamber is provided in a structural manner. The workpiece spindle is supported by a front fixed bearing 4 and a rear loose bearing 5 in a conventional manner, independent of the drive. The drive motor 3 is formed as a kit motor. It includes a motor housing 6 and a stator 7 mounted in it on the one hand, and a rotor 8 to be mounted on a rotor support 9 on the other hand. The motor housing 6 is mounted on the spindle box 1 with a motor flange 10. The motor flange 10 and the motor housing 6 are connected with one another by a web 11 which forms a ring passage 12 between these parts.

The rotor 9 is clamped by clamping sleeves 13 and 14 on the free end of the workpiece spindle. The motor chamber is closed by a cover 15. Behind the rotor support 9, a pressure flange 16 and a clamping flange 17 are non-displaceably mounted on the workpiece spindle 2. The clamping flange 17 carries a clamping cylinder-piston unit 18 for a not shown workpiece clamping device. The pressing flange 16 is provided with pressure screws 19 which are distributed over its periphery. The clamping sleeves 13 and 14 can be clamped by the pressing screws 19. The clamping sleeves 13 and 14 are supported on the inner ring of the loose bearing 5, center the rotor 8 and provide for a play-free, frictional connection to the workpiece spindle 2.

A connecting opening 20 is provided in the cover 15 for supplying a cooling medium. The connecting opening 20 opens in a ring gap 22 between the pressing flange 16 and the clamping sleeve 13. From here the cooling medium can flow into the cooling medium passage 21 of the rotatable motor part. The cooling medium passage 21 is formed by grooves in the openings of the clamping sleeves 13 and 14. The cooling medium flows finally through a further cooling medium passage 23 formed as a ring gap 26, to an outlet opening 24 in the spindle box 1. The outlet opening 24 is closed by a ventilating screw 25.

Due to the inner cooling, the hot motor parts are thermally insulated by an air layer from the highly accurate parts of the spindle box and the workpiece spindle 2. This is achieved by both ring gaps 22 and 26 and the cooling medium passages 21 simultaneously reducing the heat transfer between the rotor 8 and the workpiece spindle 2 through the web 30 which is unavoidable for the torque transmission.

Figure 2:
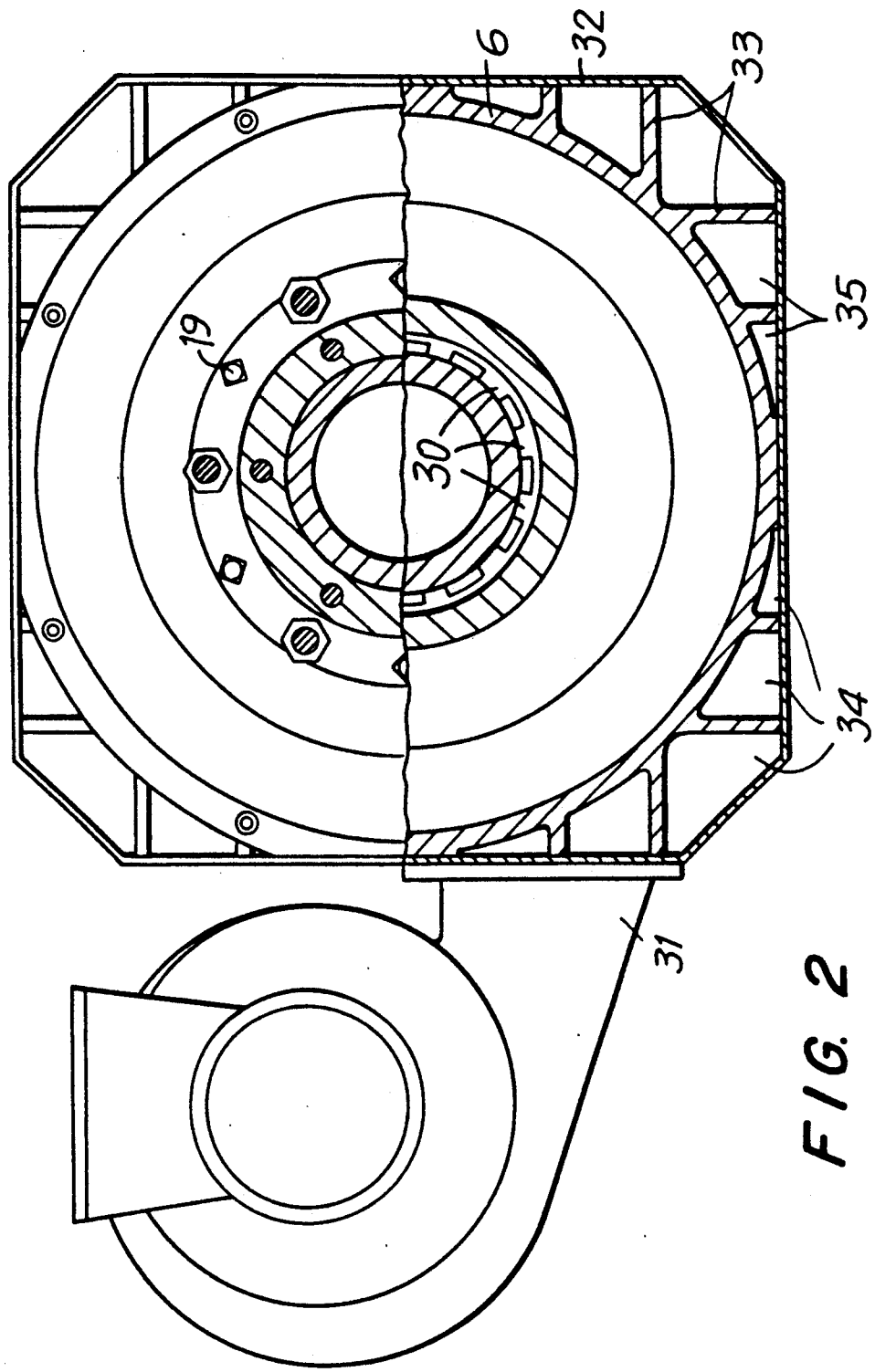
FIG. 2 is a view showing a partial side section of the spindle box.

The outer cooling medium stream produced by an external fan 31 secured to motor cover 32 as shown in FIG. 2 is supplied through the double wall of the motor housing 6 and the motor flange 10 between them and used for insulating the spindle box 1 from the drive motor 3. The cooling medium stream flows between the motor housing 6 and a motor cover 32 through aerating cross-section 34 of a cooling medium passage 35 provided between cooling ribs 33 of the drive motor 3, to the and of the workpiece spindle. There it escapes through an outlet gap 27 to the environment.

Figure 3:
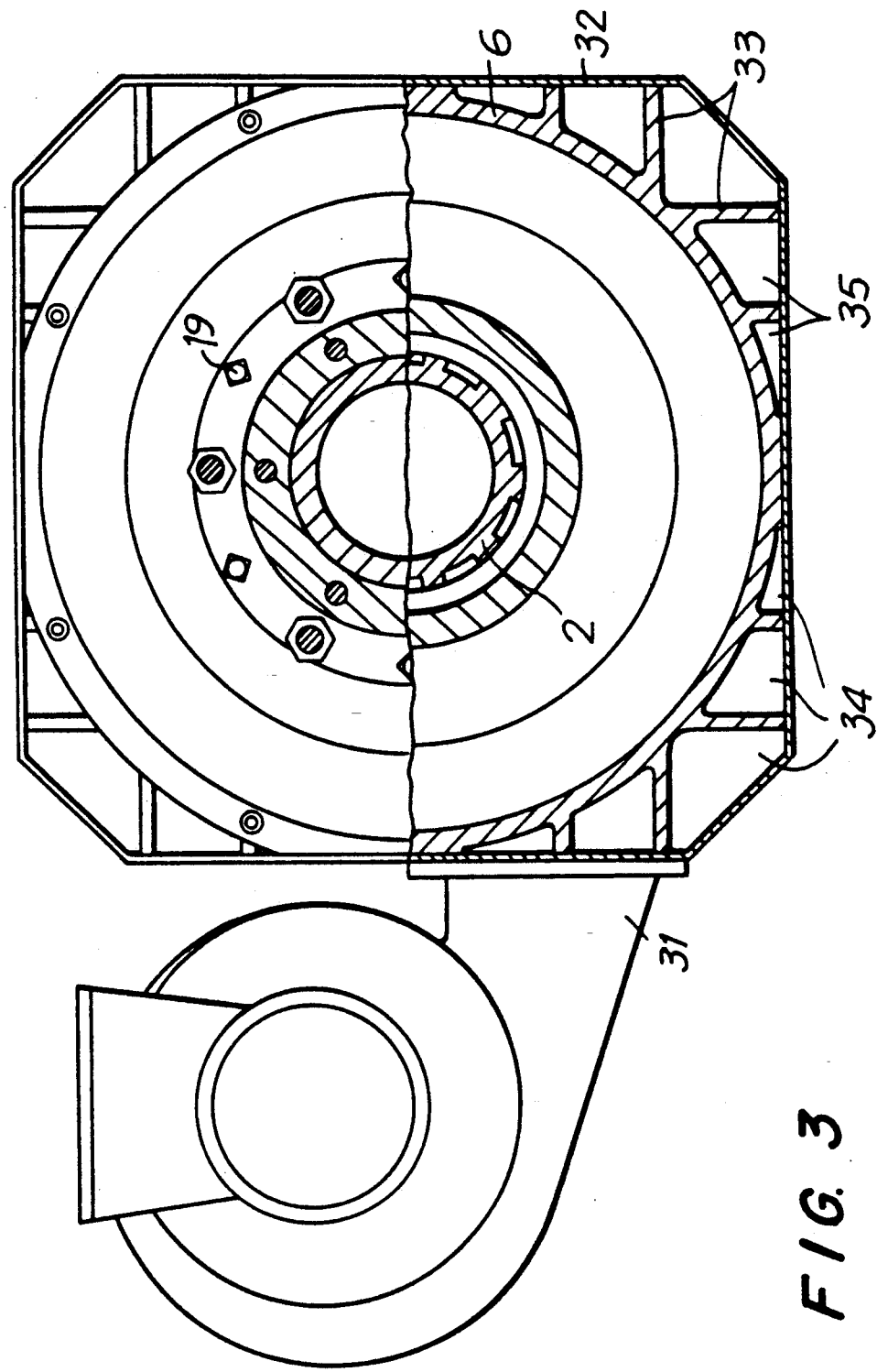
FIG. 3 is a view corresponding to the view of FIG. 2 but showing another embodiment of the invention.

It is to be understood that it is possible to produce both cooling medium streams by a single external fan when prepared air is used for both cooling medium streams. It is also possible to use a single cooling medium stream which is subdivided into two cooling medium paths. If here no prepared air is used, the inner chamber of the motor must be sealed from penetration of the cooling medium. The invention of course covers such structural alternatives. Also it is possible to form the cooling medium passages as longitudinal grooves provided on the periphery of the workpiece spindle as shown in FIG. 3.

It will be understood that each of the elements described above, or two or more together, may also find a useful application in other types of constructions differing from the types described above.

While the invention has been illustrated and described as embodied in a drive for a workpiece spindle of a machine tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A drive for workpiece spindle of a machine tool, comprising a drive motor arranged on a free end of a workpiece spindle, said drive motor including a motor housing, a rotor mounted on the workpiece spindle and a stator arranged in said motor housing, said motor housing being connected with a spindle box and having a motor cover; and means forming cooling medium passages between said motor housing and said motor cover, between the spindle box and said rotor.

2. A drive as defined in claim 1, wherein said rotor is provided with clamping sleeves, said cooling medium passages including first cooling medium passages provided between said rotor and the workpiece spindle and formed in said clamping sleeves.

3. A drive as defined in claim 1, wherein the workpiece spindle has longitudinal grooves on its periphery, said cooling medium passages including first cooling medium passages provided between said rotor and the workpiece spindle and formed by said longitudinal grooves.

4. A drive as defined in claim 1; and further comprising a motor flange connected with the spindle box and forming a ring passage with said motor housing, said cooling medium passages including second cooling medium passages supplied with cooling medium from said ring passage.

5. A drive as defined in claim 1, wherein said cooling medium passages are formed so as to provide two separate cooling medium streams.

6. A drive as defined in claim 5, wherein said motor housing is provided with a motor cover, said drive motor having an end facing toward the spindle box and a side facing away of the spindle box, said cooling medium passages being formed so that one of said cooling medium streams flows from the end of the drive motor facing toward the spindle box then between said motor housing and said motor cover to the end of the drive motor facing away of the spindle box, while another of said cooling medium streams flows from the side of said drive motor facing away of the spindle box in said cover and then between said rotor and the workpiece spindle.

7. A drive as defined in claim 6, wherein the spindle box has a ventilating screw, said another cooling medium stream discharges through said ventilating screw.

8. A drive as defined in claim 1, wherein said cooling medium passages are formed so that an air is used as a cooling medium; and further comprising means for transporting the air through the cooling medium passages.

9. A drive as defined in claim 8, wherein said transporting means includes a fan.

* * * * *